United States Patent
Gillette et al.

[19]

[11] Patent Number: 6,018,427
[45] Date of Patent: *Jan. 25, 2000

[54] FREE FLOATING FILTER CLAMP

[75] Inventors: Thomas Floyd Gillette, Caledonia; Brian Mark Fauci, Holley, both of N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/686,044

[22] Filed: Jul. 24, 1996

Related U.S. Application Data

[60] Provisional application No. 60/008,050, Oct. 30, 1995.

[51] Int. Cl.[7] .............................. G02B 5/22; G02B 7/02
[52] U.S. Cl. ......................... 359/892; 359/891; 359/889; 359/885; 359/819; 359/820
[58] Field of Search ..................... 359/198, 819, 359/821, 827, 892, 889, 891, 218, 820; 362/293

[56] References Cited

U.S. PATENT DOCUMENTS

| | | | |
|---|---|---|---|
| 2,009,145 | 7/1935 | Nathan | 240/3.1 |
| 2,401,044 | 5/1946 | Brandt | 88/113 |
| 2,444,520 | 7/1948 | Marsh | 88/65 |
| 2,498,278 | 2/1950 | Kaplowitz | 88/24 |
| 2,503,714 | 4/1950 | Eagle et al. | 88/24 |
| 2,589,680 | 3/1952 | Denny | 88/24 |
| 4,381,885 | 5/1983 | Coquin | 359/892 |
| 4,383,735 | 5/1983 | Stravitz | 350/318 |
| 4,575,230 | 3/1986 | Carson et al. | 355/75 |
| 4,823,245 | 4/1989 | Leverte | 362/293 |
| 5,276,556 | 1/1994 | Wang | 359/892 |
| 5,530,547 | 1/1996 | Arnold | 359/819 |

*Primary Examiner*—Cassandra Spyrou
*Assistant Examiner*—Audrey Chang
*Attorney, Agent, or Firm*—Palmela R. Crocker

[57] ABSTRACT

A filter clamp for retaining a filter, comprising a frame having an aperture to accommodate the filter, a clamp member having a clamp opening for alignment with the aperture when the clamp is in a mounted position, and a connector having a plurality of openings spaced about the aperture of the frame and mating protrusions spaced about the clamp opening of the clamp member. At least two protrusions extend through their mating openings and have their free ends formed at an angle to the openings so as to retain the clamp member in a mounted position containing the filter between the periphery and the frame while allowing the clamp member to move laterally, longitudinally and upwardly in relation to the frame sufficient amounts to accommodate expansion and contraction of the filter.

12 Claims, 4 Drawing Sheets

FREE FLOATING FILTER CLAMP

CROSS REFERENCE TO RELATED APPLICATION

Reference is made to and priority claimed from U.S. provisional application Ser. No. 60/008,050, filed Oct. 30, 1995, entitled FREE FLOATING FILTER CLAMP.

FIELD OF THE INVENTION

The present invention relates to a filter clamp for retaining a filter in position on the clamp.

BACKGROUND OF THE INVENTION

Conversion of analog images into digital data has become widespread for a variety of applications, including storing, manipulating, transmitting and displaying or printing copies of the images. For example, images captured in photographic media are being converted to digital data and stored on compact discs for readout and display as a video image or for printing with various types of color printers. In order to capture the photographic image digitally, the image frame is scanned with a light beam or line, and the light transmitted through the image is detected, typically as three primary color light intensity signals, and digitized. The digitized values may be formatted to a standard for video display and stored on compact disc or magnetic media. Such film digitizers take a variety of forms and the various common aspects of film digitizing, particularly line illumination and linear CCD-based digitizers, are described in greater detail in commonly assigned U.S. Pat. No. 5,012,346.

In the field of color scanners, such as described above, as well as elsewhere in the fields of capturing real images and copying recorded images using light, as well as in other areas, there is often a need to provide a filter in a given light path. Such filters, like most components of an optical system, are typically held firmly in the required position. This is true in particular in color scanners. In some color scanners it is necessary to provide a filter in the optical path, that is between an image to be scanned and a sensor. For example, the scanner may have a lens between the image location for scanning and the sensor, and a filter between the lens and the sensor. A useful class of filters for this and other purposes, are those known as WRATTEN filters available from Eastman Kodak Company, Rochester, N.Y. Such filters are made of a dye containing gelatin layer on a polyester base. The dye or dyes in the gelatin are chosen for the desired absorption profile.

Filters of the above type can, however, contract and expand in all three dimensions with changes in humidity and temperature. This contraction/expansion range is quite low, for example being only in the neighborhood of about 3% in each dimension. In most applications this has no noticeable effect. However, in the field of color scanners where light from the image being scanned is concentrated in a narrow beam before falling upon the sensor, dimensional changes in optical components between the location of an image to be scanned and the sensor can be critical. Many arrangements for clamping filters and the like have been previously known. For example, various arrangements are described in U.S. Pat. No. 2,444,520; U.S. Pat. No. 2,503,714; U.S. Pat. No. 4,575,230; U.S. Pat. No. 4,823,245; U.S. Pat. No. 2,009,145; U.S. Pat. No. 2,589,680; U.S. Pat. No. 2,498,278; and U.S. Pat. No. 4,383,735. However, such arrangements rigidly clamp the filter in position without allowance for contraction/expansion.

It would be desirable then, to ensure that changes in filter dimensions due to expansion/contraction under different environmental conditions, will not have an adverse effect on an optical apparatus using such a filter. It would be particularly desirable to ensure that in a scanner, changes in dimensions of a filter positioned in the optical path between the image to be scanned and a sensor, do not cause distortion of the image received by the sensor.

SUMMARY OF THE INVENTION

The present invention recognizes that conventional filter clamps, which rigidly clamp a filter in place, can be disadvantageous in applications where it is important to avoid even seemingly minor image distortions. This is particularly true in scanners where the filter is positioned in the optical path (particularly between the lens and the sensor). This results from the fact that a rigidly clamped filter when subjected to environmental changes (such as in temperature or humidity) must expand/contract. While the change in any dimension may be relatively small, when the filter is rigidly clamped such dimensional changes are expressed in the form of buckling, warping or other distortions of the normally planar filter. These variable distortions introduce undesirable artifacts into the image sensed by the sensor. The present invention then, avoids the use of a rigid clamp while still suitably retaining the filter in the required position.

In particular, the present invention provides a filter clamp for retaining a filter. The clamp comprises:

a frame having one or more apertures to accommodate respective filters;

a clamp member for each aperture, having an opening for alignment with the aperture when the clamp is in a mounted position; and a connector for each clamp member and corresponding aperture, having members spaced about the aperture of the frame and mating members spaced about the opening of the clamp member, so as to retain the clamp member in a mounted position containing the filter between the periphery and the frame while allowing the clamp member to move laterally, longitudinally and upwardly in relation to the frame sufficient amounts to accommodate expansion and contraction of the filter.

In one arrangement, the connector comprises a plurality of openings (such as slits) and mating protrusions (such as tabs) some of which are spaced about the aperture and others of which are spaced about the opening in mating relationship. For example, the openings can be spaced about the aperture and the protrusions spaced about the opening, or the reverse arrangement can be used (that is, openings spaced about the clamp opening). Preferably, at least two opposing protrusions extend through their mating openings and have their free ends formed at an angle to the openings. By this latter arrangement, the protrusions retain the clamp member in the mounted position.

The present invention also provides an optical apparatus having a light source, a lens, an image capture medium (such as photographic film; or a linear or area Charge Coupled Devices, referenced as CCDs), and a filter assembly positioned between the lens and the image capture medium. The filter assembly being a filter clamp of any type as described above, with a filter clamped in position between a mounted clamp member and the frame. The optical apparatus may particularly be a scanner having a light source, a lens, an image sensor, and an image holder to retain an original image to be scanned in a light path between the light source and lens. The scanner may have the filter assembly positioned in the optical path between the light source and the image sensor, most preferably between the lens and the image sensor.

The filter clamp of the present invention then, is capable of retaining a filter in the desired position. However, the connector used is of a design which allows the filter to freely expand/contract due to variations in environmental conditions. This avoids or reduces filter buckling or other distortions over a wide range of expected environmental conditions. In applications where even minor filter buckling would be very undesirable, such as in a scanner, this reduces distortions being introduced into the image sensed by the sensor, thereby facilitating recording of a more accurate image by the scanner.

DRAWINGS

Embodiments of the invention will now be described with reference to the drawings in which.

EMBODIMENTS OF THE INVENTION

Figure 1:
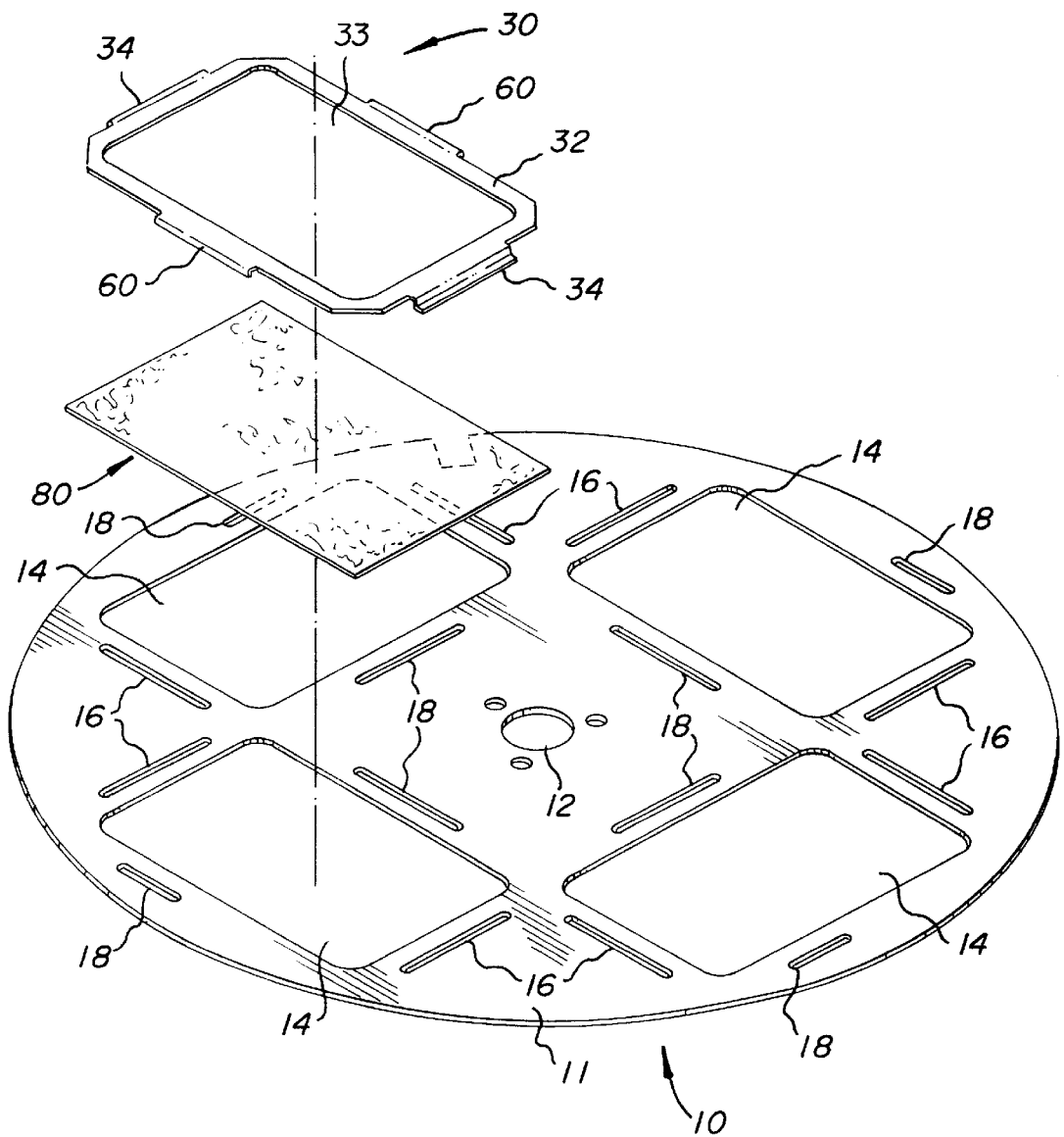
FIG. 1 is an exploded perspective view of a filter clamp of the present invention also showing a filter in position to be clamped (the filter clamp and filter together sometimes being referenced as a "filter assembly")
Figure 2:
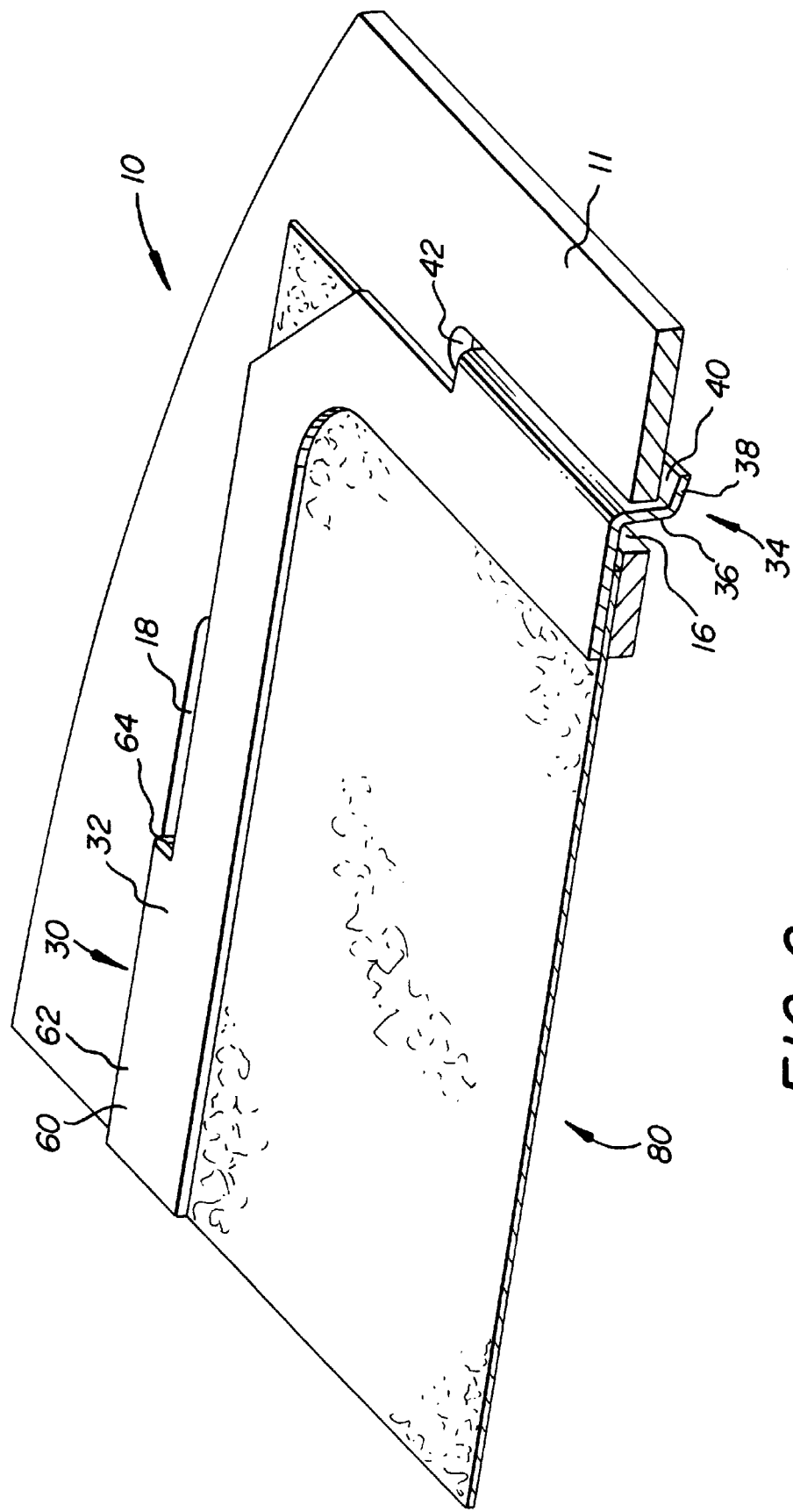
FIG. 2 is an enlarged perspective of a portion of the filter assembly of FIG. 1 (filter clamped in position)

Referring to FIG. 1, the filter clamp shown is generally designated by numeral 10. Clamp 10 has a circular frame 11 with central opening 12 for rotation by a suitable drive shaft. Frame 11 has four generally rectangular apertures 14 each for accommodating filters of different filtering characteristics in alignment with a corresponding aperture 14. A clamp member 30 is provided for each aperture 14 (only one clamp member 30 being shown in FIG. 1 for simplicity). Clamp member 30 has a body 32 dimensioned to extend beyond aperture 14 so as to retain a filter 80 between body 32 and the frame 11 about the periphery of aperture 14, when member 30 is in a mounted position (as shown in FIG. 2).

Figure 4:
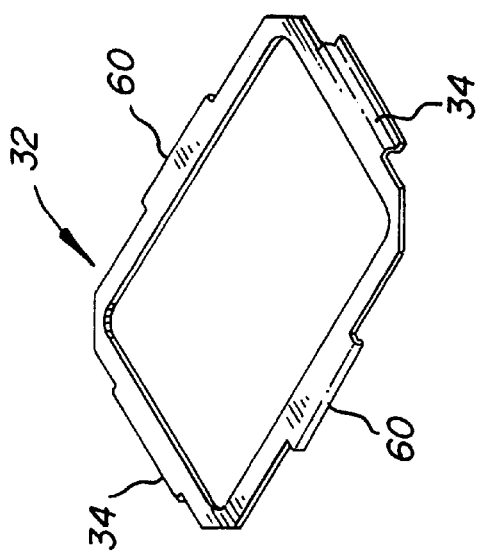
FIG. 4 is a perspective view of the clamp member of the filter clamp shown in FIG. 1.
Figure 6:
FIG. 6 is an end elevation of the clamp member of the filter clamp shown in FIG. 1.
Figure 3:
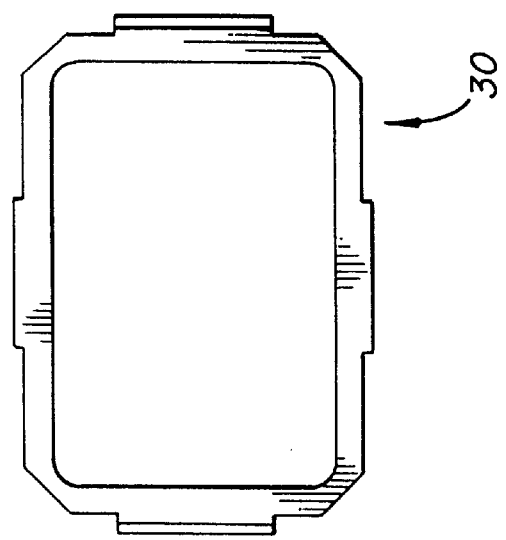
FIG. 3 is a top plan view of the clamp member of the filter clamp shown in FIG. 1.
Figure 5:
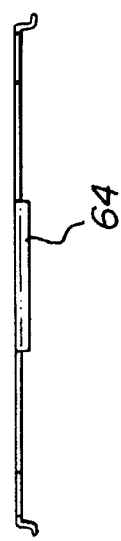
FIG. 5 is a side elevation of the clamp member of the filter clamp shown in FIG. 1.

A connector is provided which is composed of a set of opposed end slits 16 and a set of opposed side slits 18, spaced about each aperture 14, and a set of end tabs 34 and side tabs 60 spaced about body 32 (and hence about a clamp opening 33) of clamp member 30. Side tabs 60, as best seen in FIGS. 2, 4 and 5, each consists of a flat portion 62 which extends outwardly on the same plane as the remainder of body 32, then a downwardly extending portion 64 which is bent downwardly at about 90° to flat portion 62. Each portion 64 need only extend down sufficiently far such that when clamp member 30 is in the mounted position shown in FIG. 2, downwardly extending portion 64 extends into (but not necessarily through) a corresponding side slot 18 in frame 11.

Figure 7:
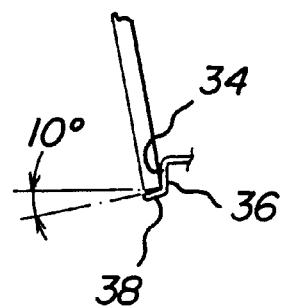
FIG. 7 is an enlarged vertical cross section of end tabs of the clamp member of the filter clamp shown in FIG. 1.

Each end tab 34, on the other hand, has both a downwardly extending portion 36 which is bent downwardly at about 90° to the remainder of body 32, and a lower outwardly extending (that is, extending away from aperture 14 when clamp member 30 is in the mounted position) portion 38 bent at an angle of about 100° to downwardly extending portion 36 (see FIG. 7 in particular). This feature of tabs 34 extending downward then outward, assists in assembly and removal of clamp member 30 from frame 11. When the clamp member 30 is in the mounted position to retain filter 80 between clamp body 32 and frame 11 about the periphery of the aperture 14, portion 36 will extend through a corresponding end slot while portion 38 will extend outwardly beneath frame 11. Since both opposed end tabs 34 are of the same construction, and opposed end slots 16 are also of the same dimensions, outwardly extending portions 38 function to hold clamp member 30 in the mounted position as shown in FIG. 2. However, it will be seen most clearly from FIG. 2, that portion 38 will normally be positioned below (that is, not in contact with) frame 11. Thus, even when in the mounted position to retain a filter 80, clamp member 30 still has a freedom of movement in the upward direction to accommodate increase in the thickness of filter 80 due to temperature of humidity changes. The degree of vertical freedom of movement is limited by the distance portions 38 can move upward before contacting frame 11.

On the other hand, tabs 34 are of a length which is shorter than the length of their mating end slots 16, while the thickness of portions 36 is narrower than the width of mating end slots 16. Similarly, downwardly extending portions 64 of side tabs 30 are of a length which is shorter than the length of their mating side slots 18, while the thickness of portions 64 is narrower than the width of mating side slots 16. Because of this arrangement, it will be seen that clamp member 30, when in the mounted position to retain a filter 80 as shown in FIG. 2, can freely move both lengthwise and sideways to accommodate expansion/contraction of filter 80. In the construction shown, lengthwise movement is limited only by the difference between the thickness of portions 36 of end tabs 34 and the width of end slots 16 (since side slots 18 are considerably longer than side tabs 60). Similarly, sideways movement is limited only be the difference in thickness of portions 64 of side tabs 30 and the width of side slots 18 (since end slots 16 are considerably longer than the length of end tabs 34).

As a result of the above configuration, it will be seen that when a clamp member 30 is in a mounted position retaining a filter 80 between it and the periphery of frame 11 about an aperture 14, as shown in FIG. 2, it will contain the filter in the position shown in FIG. 2. However, the clamp member will still be free to move laterally, longitudinally and upward to accommodate expansion and contraction of filter 80.

In order that each clamp member 30 can be readily moved between a mounted position shown in FIG. 2, and a released position shown in FIG. 1, it is preferably made of a resilient material. Also, both the clamp member 30 and frame 11 should be of a material with low expansion and contraction over the range of conditions expected to be encountered. It has been found that for frame 11 a metal of cold rolled aluminum grade 5052-H32 is particularly useful. For clamp member 30 precision brand stainless steel shim stock cold rolled full hard type 302 is particularly useful. For a typical Wratten filter of dimensions of about 6 cm length, 4 cm width, and about 0.1 mm thickness, it has been found that each dimension may vary about 3% under typical expected variations in conditions (59° F. to 87° F.; 15% to 76% relative humidity). This results in about a range of expansion/contraction in each of length and width of about 0.2 cm, and in thickness of about 0.15 mm, under that range of conditions. Thus, filter clamp 10 is constructed to accommodate such a range with clamp member 30 remaining free floating throughout the range (that is, within at least that range, clamp member 30 does not end up clamping the filter 80 rigidly in position against frame 11).

Figure 8:
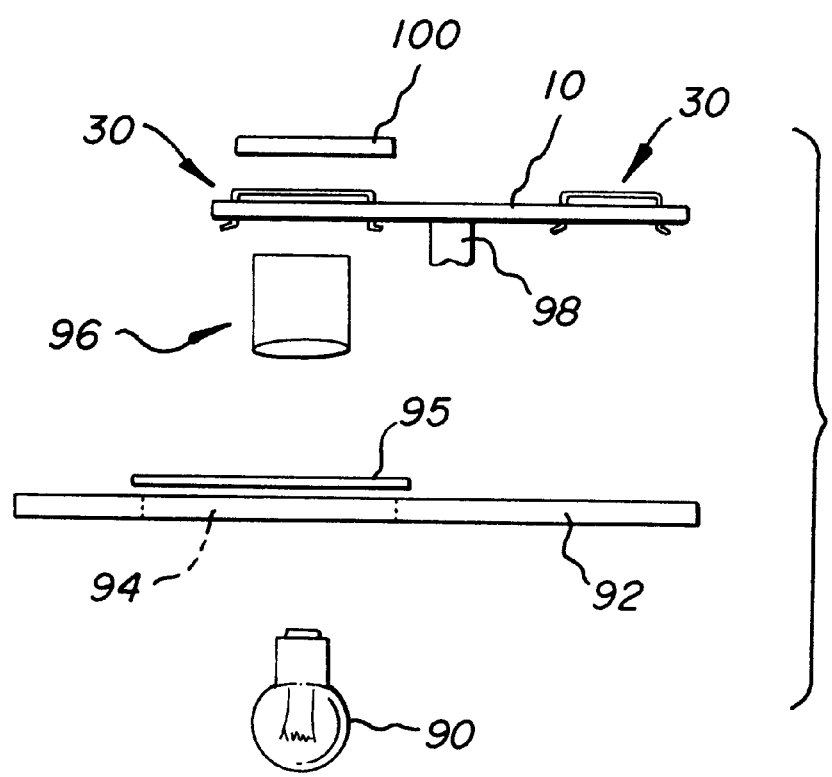
FIG. 8 is a schematic view of a scanner showing the filter clamp assembly of FIG. 1 in position for use.

Referring to FIG. 8, an optical apparatus in the form of a scanner, which uses the film clamp of FIGS. 1–7, is shown. The scanner has a light source 90 arranged to shine through an aperture 94 in a platen 92. Platen 92 is movable in the left and right directions of FIG. 8. An original image 95 to be scanned is positioned in alignment over aperture 94. A lens 96 receives light passing through aperture 94 and image 95 and focuses it onto a trilinear CCD assembly 100, in a known manner. Filter clamp 10 is shown positioned in the optical path between lens 96 and CCD assembly 100. Only two clamp members 30 are shown in their mounted position each holding respective different filters 80 (not visible in FIG. 8) between them and frame 11, although it will be appreciated that there are four mounted clamp members 30 each retaining respective filters of different filtering characteristics between clamp member 30 and frame 11. Clamp members 100 are positioned to be on the upper side of frame 11, as shown in FIG. 8. Central opening 12 is connected to a drive shaft 98 which can be rotated as desired by a motor (not shown) to rotate different ones of the four filters into position between the lens 96 and CCD array 100.

Due to the construction of the clamp, as already described, expansion and contraction of a filter 80 can readily be accommodated by freely floating clamp member 30, while still retaining each filter 80 between clamp member 30 and frame 11. This is superior to conventional clamps which rigidly clamp a filter onto a frame. With rigid clamping filter expansion and contraction is forced to express itself as warping or other distortions on the filter, thereby introducing errors into light from an image which passes through the filter. The clamp of the present invention, on the other hand, since it does not rigidly retain a filter in position, allows it to remain flat while expanding or contracting.

It will be appreciated from the above description that the described apertures 14 could be of a different shape. Of course clamp 10 could have one or more of any such apertures. Clamp members 30 could be adjusted in shape to conform to the periphery of such different shaped apertures. Also, the location of some or all of the tabs could be moved to frame 11, while some or all of the mating slots were moved to body 32. Further, it will be appreciated that other connectors, such as other shaped openings and mating protrusions, could be used instead of the elongated shaped slots 16 and 18, and mating tabs 34 and 60.

The preceding examples are set forth to illustrate specific embodiments of this invention and are not intended to limit the scope of the invention. It will be understood that variations and modifications can be effected within the spirit and scope of the invention.

Parts List

10 Clamp
11 Frame
12 Opening
14 Apertures
16 Slots
18 Slots
30 Clamp Member
32 Clamp Body
33 Clamp Opening
34 Tabs
36 Downwardly Extending Portion
38 Outwardly Extending Portions
60 Tabs
62 Flat Portion
64 Portions
80 Filter
90 Light Source
92 Platen
94 Aperture
95 Image
96 Lens
98 Drive Shaft
100 CCD Assembly

We claim:
1. A filter clamp for retaining a filter, comprising:
at least one gelatin filter;
a frame having an aperture to accommodate the filter;
a clamp member having a clamp opening for alignment with the aperture when the clamp is in a mounted position; and
a connector having a plurality of openings spaced about the aperture of the frame and mating protrusions spaced about the clamp opening of the clamp member, at least a first pair of opposing protrusions extending through their mating openings, wherein the length of the protrusion is shorter than the length of the mating opening and said protrusions having their free ends formed at an angle to the openings so as to retain the clamp member in a mounted position containing the gelatin filter between the periphery and the frame, and at least a second pair of opposing protrusions extending downward into their mating openings, wherein the length of the protrusion is shorter and the width of the protrusion is narrower than the length and width of the mating opening while allowing the clamp member to move laterally, longitudinally and upwardly in relation to the frame sufficient amounts to accommodate expansion and contraction of the gelatin filter.

2. A filter clamp according to claim 1 wherein the openings are slits and the protrusions are mating tabs.

3. A filter clamp according to claim 1 wherein the frame has a plurality of apertures, and additionally comprising a plurality of clamp members and connectors which retain respective clamp members in a mounted position containing respective gelatin filters between the periphery of each clamp member and the frame, while allowing each clamp member to move laterally, longitudinally and upwardly in relation to the frame sufficient amounts to accommodate expansion and contraction of the gelatin filters.

4. A filter clamp according to claim 3 wherein the frame is circular and has the apertures disposed in a circular arrangement thereon.

5. A filter clamp according to claim 1 wherein when the clamp member is in the mounted position at least two opposed ones of the protrusions extend through the mating openings then outwardly away from the aperture.

6. A filter clamp according to claim 1, wherein the gelatin filter has a polyester base and a dye containing gelatin layer thereon.

7. An optical apparatus having a light source, a lens, an image capture medium, and a filter assembly positioned between the lens and the image capture medium, the filter assembly comprising:

a frame having an aperture;

a clamp member in a mounted position with a clamp opening in alignment with the aperture;

a gelatin filter positioned between the frame and the clamp member;

a connector having a plurality of openings spaced about the aperture of the frame and mating protrusions spaced about the clamp opening of the clamp member, at least a first pair of opposing protrusions extending through their mating openings, wherein the length of the protrusion is shorter than the length of the mating opening and said protrusions having their free ends formed at an angle to the openings so as to retain the clamp member in the mounted position containing the gelatin filter between the periphery and the frame and at least a second pair of opposing protrusions extending downward into their mating openings, wherein the length of the protrusion is shorter and the width of the protrusion is narrower than the length and width of the mating opening while allowing the clamp member to move laterally, longitudinally and upwardly in relation to the frame sufficient amounts to accommodate expansion and contraction of the gelatin filter.

8. A filter clamp according to claim 7, wherein the gelatin filter has a polyester base and a dye containing gelatin layer thereon.

9. A scanner having a light source, a lens, an image sensor, an image holder to retain an original image to be scanned in a light path between the light source and lens, and a filter assembly positioned between the lens and the image holder and image sensor, the filter assembly comprising:

a frame having an aperture;

a clamp member in a mounted position with a clamp opening in alignment with the aperture;

a gelatin filter positioned between the frame and the clamp member;

a connector having a plurality of openings spaced about the aperture of the frame and mating protrusions spaced about the clamp opening of the clamp member, at least a first pair of opposing protrusions extending through their mating openings wherein the length of the protrusion is shorter than the length of the mating opening and said protrusions having their free ends formed at an angle to the openings so as to retain the clamp member in the mounted position containing the gelatin filter between the periphery and the frame and at least a second pair of opposing protrusions extending downward into their mating openings, wherein the length of the protrusion is shorter and the width of the protrusion is narrower than the length and width of the mating opening while allowing the clamp member to move laterally, longitudinally and upwardly in relation to the frame sufficient amounts to accommodate expansion and contraction of the gelatin filter.

10. A scanner according to claim 9 wherein the sensor is a CCD sensor.

11. A scanner according to claim 9 wherein the openings are slits and the protrusions are mating tabs.

12. A filter clamp according to claim 9, wherein the gelatin filter has a polyester base and a dye containing gelatin layer thereon.

* * * * *